July 16, 1935.   O. F. HIPKINS   2,008,210
TRACTION DEVICE
Filed Aug. 12, 1933   4 Sheets-Sheet 1

Inventor:
Otho F. Hipkins
By John W Darley
Atty.

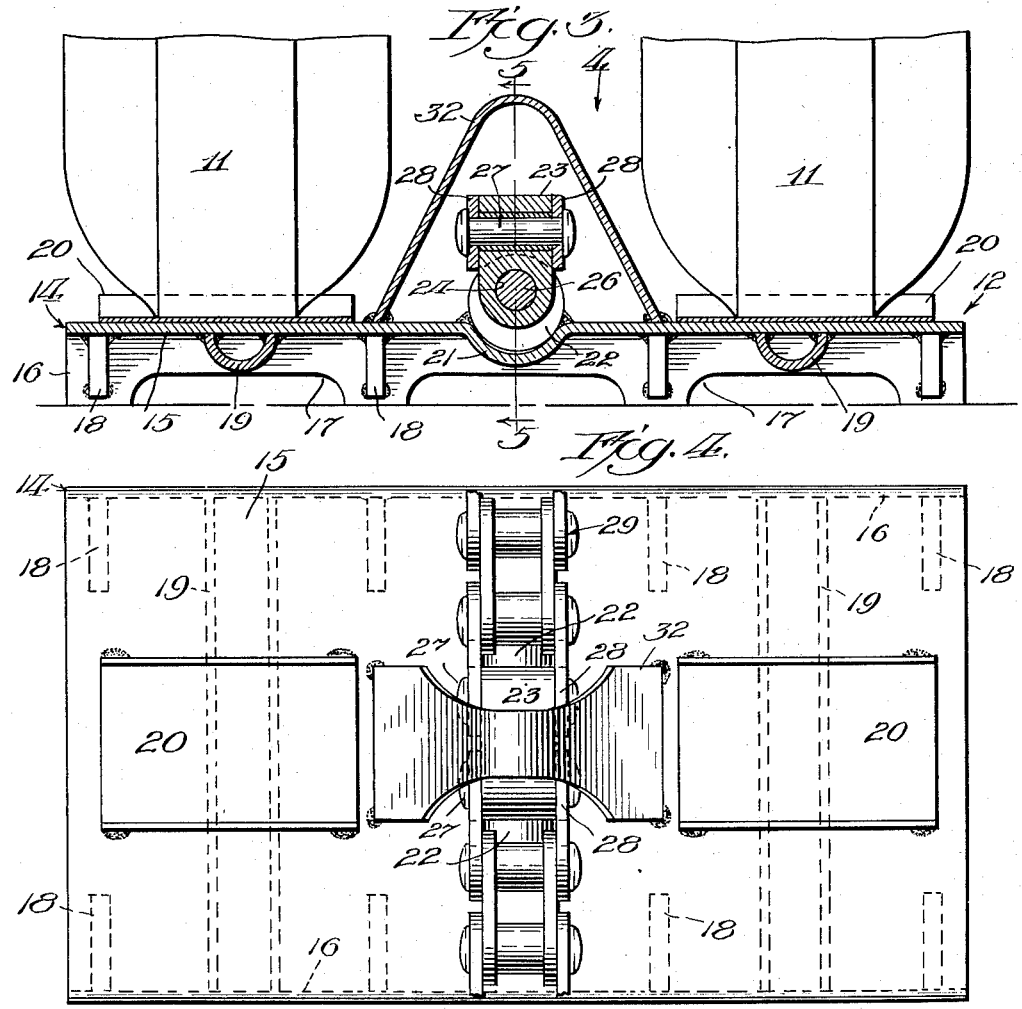
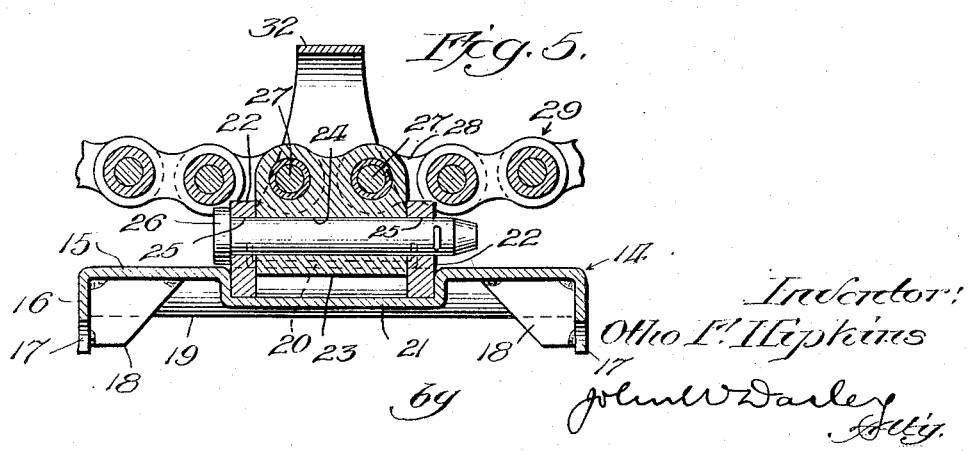

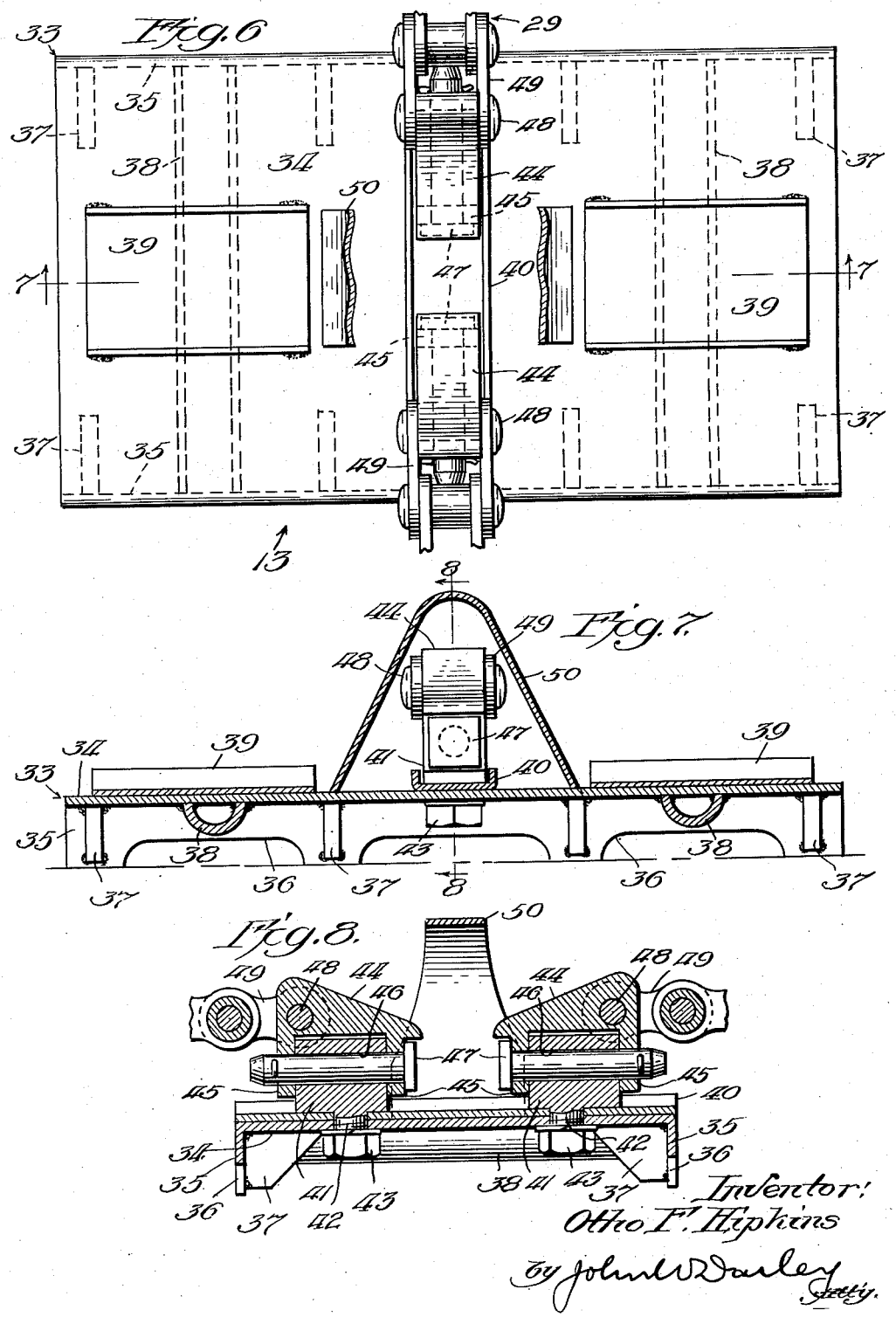

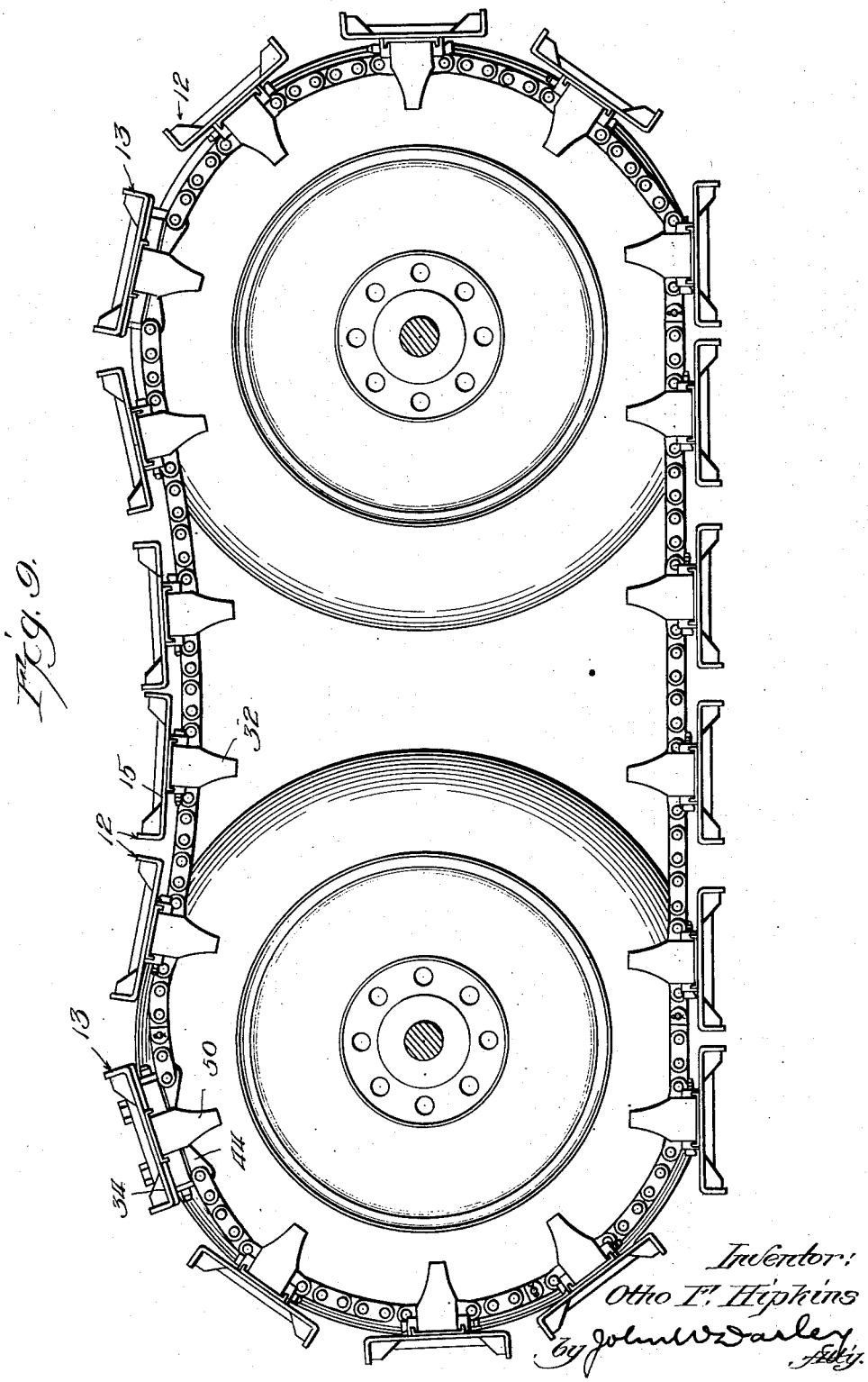

Patented July 16, 1935

2,008,210

UNITED STATES PATENT OFFICE 2,008,210

TRACTION DEVICE

Otho F. Hipkins, Port Deposit, Md.

Application August 12, 1933, Serial No. 684,793

5 Claims. (Cl. 152—14)

My invention relates to traction devices and is concerned more particularly with providing an arrangement which increases the tractive efforts of motor vehicles over a variety of terrain and which is adapted to simply encircle individual wheels, or to be applied as a band around pairs of wheels in the general manner of a tractor tread.

The present invention embodies the salient features of the traction devices disclosed in my United States Letters Patent Nos. 1,600,588 and 1,600,589, dated September 21, 1926, as regards the loose mounting of the shoes around the wheel treads and the consequent capacity of the device to creep around the wheel to thereby prevent undue wear at separated portions of the tread, the securement of an effective driving connection between the tread and shoes without requiring the looping of any chains around the spokes of the wheel, and the rocking action of each shoe as it comes into load-supporting position at the bottom of the wheel, whereby at least two shoes are always in load-sustaining position.

One object of the present invention is to provide a traction device that is not only characterized by the foregoing advantages, but which is additionally adapted for use either with individual wheels or with a pair of wheels associated in the so-called buggy construction, so that the device may be utilized on four-wheel trucks, for example, or on six-wheel vehicles, the buggy wheels being either individually encircled or looped around by a band arrangement of the shoes.

A further object is to provide a traction device in which the several shoes are connected by chain sections, any number of which may include offset links that permit a ready adjustment of the entire length of the device in order to compensate for wear of the treads or the chain.

A further object is to provide a device which utilizes a coupling shoe that connects the ends of the shoe assembly, the nature of the connection of the chain sections to the coupling shoe being such as to provide for a limited amount of adjustment on the shoe by simply reversing the positions of the shoe blocks to which the ends of the chains are attached.

A further object is to devise a traction shoe for a device of the character indicated which is composed of a number of pressed steel sections that are preferably welded together, thereby providing a relatively light construction that is characterized by an exceptionally high resistance to wear without any sacrifice of strength.

A further object is to provide each shoe of the device with a guide that extends into the groove between the dual treads of the wheels and through which the flexible chain extends, the shoe guides operating to prevent lateral shifting of the device on the wheels and also preventing the chain from chafing the side walls of the tires.

These and further objects of my invention will be set forth in the following specification, reference being had to the accompanying drawings and the novel means by which said objects are effectuated will be definitely pointed out in the claims.

In the drawings:

Fig. 3 is an enlarged section along the line 3—3 in Fig. 1, looking in the direction of the arrows, showing the details of construction of one of the traction shoes and its transverse disposition with respect to the dual treads of the wheel.

Fig. 4 is a plan view of the shoe shown in Fig. 3, looking in the direction of the arrow 4 in said figure.

Fig. 5 is a section along the line 5—5 in Fig. 3, looking in the direction of the arrows, and showing the manner of connecting the ends of the chain sections to the individual shoes.

Fig. 6 is an enlarged plan view of the coupling shoe, as viewed in the direction of the arrow 6 in Fig. 1.

Fig. 7 is a section along the line 7—7 in Fig. 6, looking in the direction of the arrows, and showing the details of construction of the coupling shoe.

Fig. 8 is a section along the line 8—8 in Fig. 7, looking in the direction of the arrows, and showing the adjustable connection between the coupling shoe and the ends of the adjacent chain sections.

Fig. 9 is an elevation, partly in section, corresponding to Fig. 1, but showing the application of my improved traction device to the so-called buggy construction composed of a pair of adjacent wheels, each having a dual tread.

Figure 1:
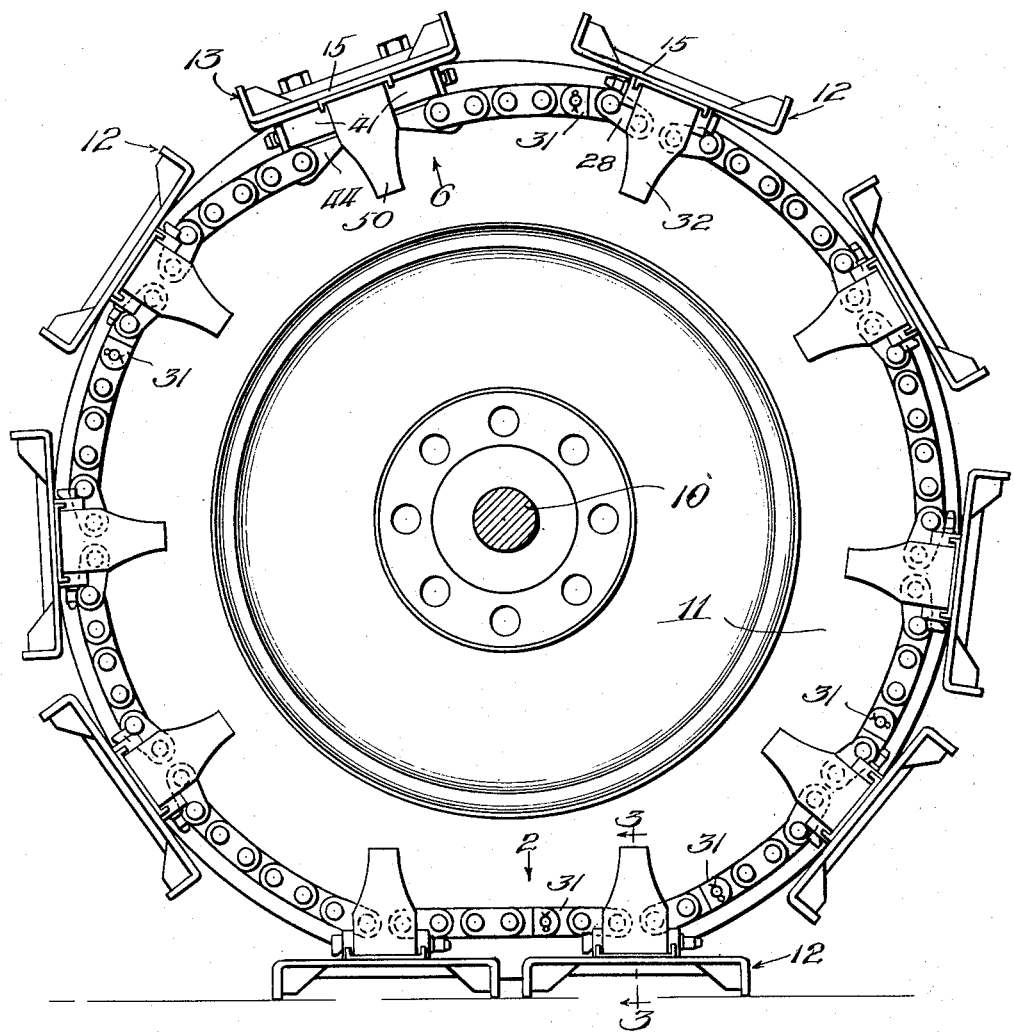
Figure 1 is an elevation, partly in section, of a wheel provided with a dual tread, one of the tread sections being removed in order to more clearly illustrate the spacing and disposition of the traction shoes around the tread.
Figure 2:
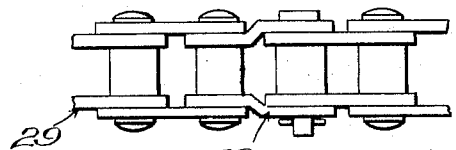
Fig. 2 is a plan view of one of the chain sections, looking in the direction of the arrow 2 in Fig. 1, and showing the offset link construction whereby the chain sections may be lengthened or shortened as desired.

Referring to the drawings, particularly to Figs. 1 to 8, inclusive, the numeral 10 designates an axle on which is mounted a wheel having dual treads 11—11. Disposed around the periphery of the treads is a traction device comprising a plurality of traction shoes 12, a coupling shoe 13, and a plurality of connecting chain sections hereinafter described.

As each of the shoes 12 is characterized by an identical construction, a description of a single shoe suffices for the remainder. Accordingly, referring to Figs. 3 to 5, inclusive, each shoe 12 is formed from a channel 14 having a base 15 and a pair of sides 16—16 depending therefrom. As clearly indicated in Fig. 3, the channel 14 extends transversely of the treads 11, so that the sides 16 exercise a biting action on the ground, while the upper surface of the base 15 is intended to contact with the treads. Each of the sides 16 may be provided with a number of relief openings 17 which serve to increase the traction of the shoe, as well as reducing its weight. In order to strengthen the shoe against the crushing weight of the applied load, a number of gusset plates 18 are uniformly distributed in the corners formed by the base and sides of the shoe, and this reenforcement may be furthered by the use of a pair of reenforcing strips 19 that may possess the semicircular section shown in Fig. 3 and which extend transversely of the shoe generally in line with the respective treads, the strips 19 being secured to the under surface of the base 15. Mounted on the upper side of the base 15 is a pair of drive plates 20, each possessing a generally channel section having a rather shallow depth and which are intended to engage with the treads of the tire in order to provide the desired driving connection between the tires and the shoes. It will be understood that the height of these plates 20 will not be sufficient to unduly bite into the tires.

A depression 21 is centrally located in the base 15 and extends transversely of the shoe substantially midway between the ends thereof. A pair of journal disks 22 are located in the ends of the depression 21 and positioned therebetween is a block 23 having a hole 24 which is in alignment with apertures 25 provided in the disks 22. A pin 26 extends through the disks and block in order to maintain the latter in the position shown in Fig. 5. The block 23 is also provided with apertures through which extend pins 27 for securing thereto the end links 28 of a chain section 29, it being understood that each of the shoes 12 is provided with the above noted block construction, so that each pair of adjacent shoes is connected by a chain section 29 after the manner generally indicated in Fig. 1. The pivotal connection of the end link 28 with the block 23 substantially causes each block to become a part of a continuous chain and the length of the several chain sections is preferably such that the assembly of shoes is more or less loosely applied around the treads of the wheels and the shoes are therefore capacitated for a substantially rocking action relative to the treads after the manner generally described in the above noted patents.

In order to compensate for the wear of the treads and the chains, it is contemplated that a number of offset links 30 (see Fig. 2) will be employed, these links being of standard construction and enabling the chains to be shortened or lengthened as desired. In Fig. 1, several such offset links are shown, the same being designated by the numeral 31.

In order to definitely locate the device on the wheel and prevent lateral shifting thereof, each shoe is provided with a guide 32 having the generally U or V-shaped formation shown in Fig. 3, the ends of the guide being secured to the base 15 of the shoe. In addition to preventing lateral shifting of the device, it will be noted that these guides also embrace the chain sections and hence prevent any chafing action of the chain on the side walls of the tire. A similar action on the part of the guides is prevented by providing each guide with sufficient surface to provide a gentle rubbing action.

One of the most important features of the traction shoe utilized in my device resides in the formation of the shoe from a number of pressed steel stampings or sections, all of which may be simply welded together to provide a substantially unitary shoe that combines the essential attributes of lightness and strength.

The coupling shoe 13 is more particularly illustrated in Figs. 6 to 8, inclusive, and, as with the shoe 12, the shoe 13 is formed from a channel 33 having a base 34 and sides 35. The shoe 13 is also provided with relief openings 36, strengthening gussets 37, reenforcing strips 38 and drive plates 39, corresponding to the similar parts for the shoe 12.

A channel 40 extends transversely of the shoe 13, midway between the ends thereof and located on the upper surface of the base 34. Adjacent each side of the shoe 13 is a block 41, from each of which depends downwardly through suitable apertures provided in the channel 40 and base 34 a stud 42 that receives on its lower end a nut 43. As clearly indicated in Fig. 8, the vertical axis of the stud 42 is offset from the vertical center line of the block 41 for a purpose presently explained. A yoke 44 embraces the opposite ends of each block 41 and a securing pin 47 extends through a hole 46 provided in each block, which hole is in alignment with appropriate apertures provided in the straddling portions 45 of the yoke. Each yoke is further provided with an aperture for receiving a pin 48 for pivotally securing an end link 49 of a chain section 29. As in the case of each shoe 12, a shoe guide 50 straddles the yoke 44 between the block 41, and the end edges of the guide are welded or otherwise secured to the base 34.

From an examination of Fig. 8, it will be apparent that a length adjustment of the device may be effected simply by reversing the position of one or both of the blocks 41. The offset disposition of the studs 42 enables the vertical end faces of each block 41 to be moved to a position closer to the vertical center line of the shoe, than the one illustrated in Fig. 8.

In Fig. 9 is illustrated the application of my traction device to the so-called buggy construction comprising a pair of associated wheels. In adapting the device shown in Fig. 1 to the arrangement shown in Fig. 9, it is merely necessary to add to the device shown in Fig. 1 a device section having an appropriate length, as determined by the spacing of the wheel axles and the diameter of the wheels. Of course, a transformation from the band type of device as shown in Fig. 9 to the simple wheel encircling type shown in Fig. 1, may be effected for the running gear construction shown in Fig. 9 by simply arranging the device as shown in Fig. 1. A determination as to the type of device most appropriate generally depends upon the nature of the terrain. The type shown in Fig. 1 is generally recommended for service on clay, sod, ice, snow, or the average terrain, while the band type illustrated in Fig. 9 is preferable for swamp land or soft sand where an exceptionally large tread area is desirable.

As already noted, the device illustrated in the present application retains the major feature of the devices shown in my prior patents, particularly as regards the loose mounting of the flexible means, i. e., the chain, and the pivotal action of the individual shoes. This action not only results in a maximum of two shoes being in a position to support the load at any given instance, but their rocking action serves to prevent the adherence or caking of mud, and this latter characteristic is furthered by the arrangement of the individual shoes whereby a vacuum is not created with the material enclosed by each shoe as the latter comes into contact with the ground.

I claim:

1. In a traction device, the combination with a wheel having a dual tread, of a plurality of shoes disposed around the tread, one of the shoes being a coupling shoe, chain sections disposed in the groove between the treads connecting adjacent pairs of shoes, and a pair of blocks mounted on the inner surface of the coupling shoe, each having a stud extending through the shoe to receive a securing nut on the end thereof, a pair of chain sections secured to the blocks, and the axis of each stud being offset from the vertical center line through the associated block whereby the length of the device may be adjusted by reversing the position of one or both blocks.

2. A coupling shoe for a vehicular traction device consisting of a plurality of shoes and a connecting chain comprising a pair of spaced blocks mounted on the inner surface of the shoe, studs extending through the shoe and offset from the vertical center line through the associated blocks, the ends of the chain being connected to the blocks and the length of the device being adapted for adjustment by reversing the position of one or both blocks.

3. A coupling shoe for a vehicular traction device consisting of a plurality of shoes and a connecting chain comprising a pair of spaced blocks mounted on the inner surface of the shoe, studs projecting through the base of the shoe with their axes offset respectively from the vertical center lines of the associated blocks, a yoke member to which one end of the chain is secured straddling each block, and a pin passing through each block and the straddling arms of the yoke, the length of the device being adjustable by reversing the position of one or both blocks.

4. In a traction device, the combination with a wheel having a dual tread, of a plurality of shoes disposed around the tread, one of the shoes being a coupling shoe, flexible members disposed in the groove between the treads connecting adjacent pairs of shoes, and a pair of blocks connected to the coupling shoe, the point of connection of each block being offset from the center thereof and one of the flexible members being connected to each block, whereby the length of the device may be adjusted by shifting one or both blocks about its or their points of connection to the shoe.

5. A coupling shoe for a vehicular traction device consisting of a plurality of shoes and attaching means connecting the shoes together comprising a pair of blocks connected to the shoe, the point of connection of each block being offset from the center thereof and the ends of the attaching means being connected to the blocks, whereby the length of the device may be adjusted by shifting one or both blocks about its or their points of connection to the shoe.

OTHO F. HIPKINS.